R. B. FAGEOL.
FLEXIBLE ROAD TRAIN.
APPLICATION FILED JULY 25, 1916.
1,226,962.
Patented May 22, 1917.
2 SHEETS—SHEET 2.
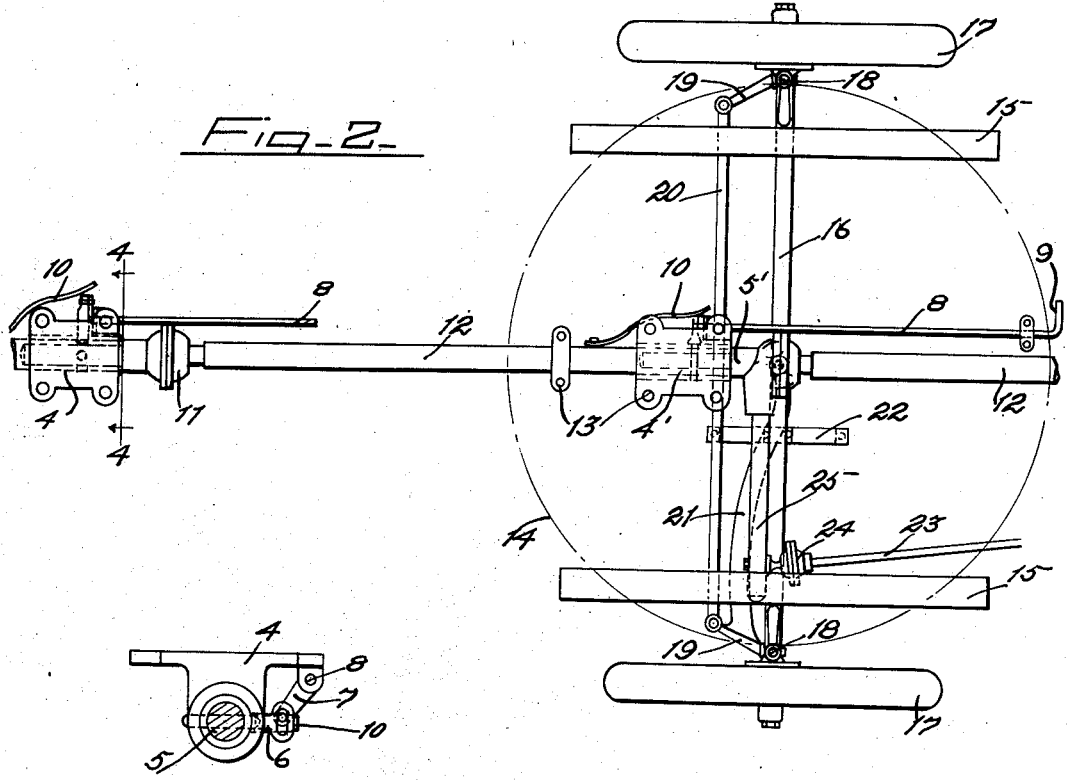
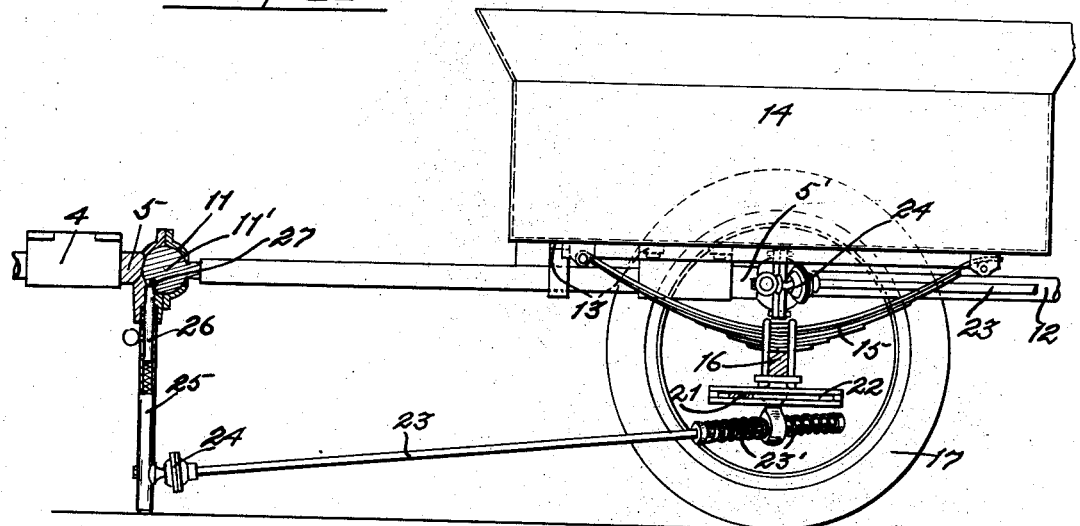

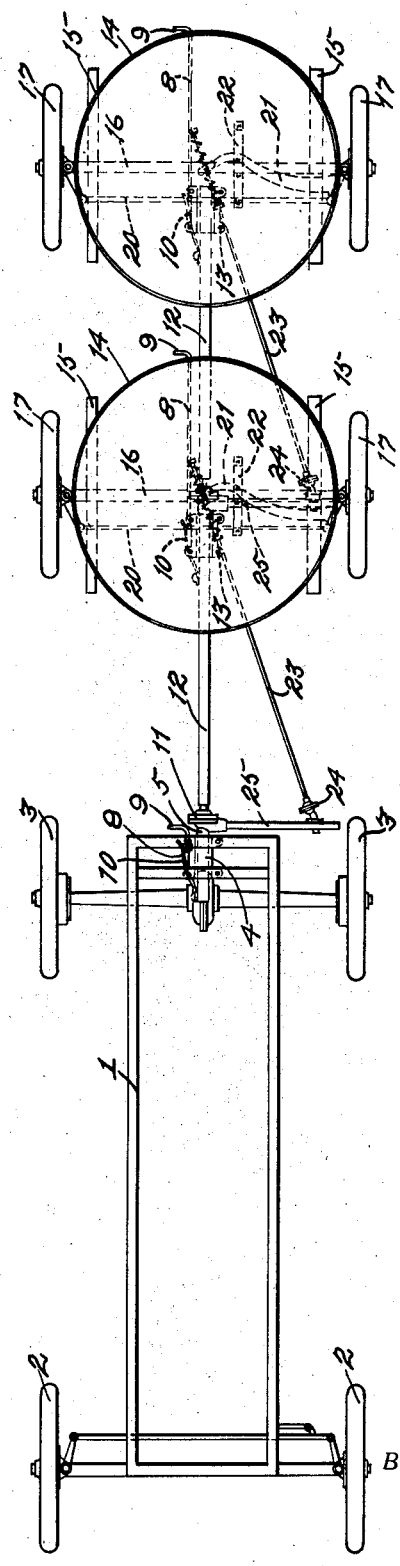

UNITED STATES PATENT OFFICE.

ROLLIE B. FAGEOL, OF OAKLAND, CALIFORNIA.

FLEXIBLE ROAD-TRAIN.

1,226,962.  Specification of Letters Patent.  Patented May 22, 1917.

Application filed July 25, 1916. Serial No. 111,156.

*To all whom it may concern:*

Be it known that I, ROLLIE B. FAGEOL, a citizen of the United States, residing at Oakland, in the county of Alameda and State of California, have invented certain new and useful Improvements in Flexible Road-Trains, of which the following is a specification.

The present invention relates to road trains and more particularly to a train composed of a plurality of separable units drawn by a tractor vehicle.

The object of the invention is to provide a road train which may be easily handled under conditions of dense and congested traffic, and from which the individual units may be readily and quickly separated. For this purpose I make use of a train of self-steering two-wheeled trailer units, each readily separable from the preceding unit, and all drawn by a suitable tractor vehicle. The individual units are comparatively small and light, and can be easily moved about by hand, when separated from the train.

The greatest advantage of my road train lies in the fact that the entire train need not be stopped at any time to await the loading or unloading of the trailer units, it being necessary to stop the train only long enough to separate therefrom or add thereto the desired units, the loading and unloading thereof being done while separated from the train. Thus the tractor vehicle can be operated practically continuously, transferring the trailer units from place to place as they are loaded and unloaded.

In order to comprehend the invention, reference should be had to the accompanying sheets of drawings, wherein—

Figure 1 is a plan view, partly diagrammatic, of my flexible road train.

Fig. 2 is a plan view, enlarged, of one of the trailer units of my road train, the body thereof merely indicated.

Fig. 3 is a side elevation of the trailer unit.

Fig. 4 is a sectional detail of the coupling member, taken on the line 4—4 of Fig. 2 and viewed in the direction of the arrows.

In the drawings the reference numeral 1 designates the frame or body of a tractor vehicle, here represented as a motor driven vehicle having steering wheels 2 and driving wheels 3. It is understood that said vehicle carries a suitable source of motive power, which forms no part of the present invention, and is therefore not herein illustrated. The rear portion of the tractor frame 1 carries a longitudinally disposed socket member 4 which is adapted to receive the cylindrical shank of a coupling member 5. A transversely disposed locking pin 6, Figs. 2 and 4 of the drawings, is passed through the socket member 4 and the coupling member 5 to retain said coupling member within said socket. Said locking pin is operated by means of a lever arm 7—Fig. 4, fixed upon the end of a rearwardly extending rotatable rod 8, the rear end of which carries a handle 9, Fig. 1. A spring 10, Figs. 2 and 4, bearing against the outer end of the locking pin 6, normally retains said pin in position.

The rear end of the coupling member 5 carries a spherical socket 1 which is adapted to receive a ball 11' forming the forward end of the trailer tongue 12. Said tongue 12 is fastened by means of brackets 13—Figs. 2 and 3 of the drawings—to the trailer body 14—Fig. 3. Said trailer body is supported through springs 15—Figs. 2 and 3, from an axle 16, at the ends of which are mounted wheels 17.

A vertically disposed pivotal connection 18 is inserted between each trailer wheel 17 and the body of the axle 16, to permit said wheels to be swung in a horizontal plane relative to said axle, to steer the trailer. For this purpose the wheels 17 are mounted upon stub axles, not shown in the drawings, to which are fixed steering arms 19. A tie rod 20 connects said steering arms 19, and a steering lever 21 extends inwardly from one of said steering arms and is guided near its inner end by spaced guide plates 22.

The inner end of said steering lever 21 is flexibly connected to a steering rod 23 (Fig. 1), which extends forwardly and is connected at its forward end by a ball and socket joint 24 with a transversely disposed arm 25 extending laterally from and fixed to the coupling member 5. Thus when any angular movement occurs between the trailer tongue 12 and the coupling member 5, as when the train is rounding a curve, the steering lever 21 will be moved by the steering rod 23 either toward the front or rear, as the case may be, and the trailer wheels 17 will thereby be turned horizontally to cause them to track in the path of the rear wheels 3 of the tractor vehicle. Springs 23, Fig. 3, acting between the steering rod 23 and the steering lever 21, relieve said lever 21 and its associated parts from any undue strains in case the angular movement between the trailer tongue 12 and the center axis of the tractor vehicle exceeds that for which the trailer steering apparatus is normally constructed.

The transversely disposed arm 25 has an additional function, namely to serve as a leg to support the forward end of the tongue 12, when said tongue is detached from the socket 4 of the preceding vehicle, as shown in Fig. 3. The coupling member 5 being freely rotatable about the ball 11', the arm 25 will fall by its own weight into a vertical position immediately upon the withdrawal of the coupling locking pin 6. A spring held bolt 26, slidably mounted within the arm 25, is adapted to enter a socket 27 in the ball 11' to retain said arm 25 in its vertical position. In this position of the arm 25, the steering rod 23 serves merely to hold the trailer wheels 17 in a straight fore and aft position.

Each trailer is identical in construction with that described above. A socket 4', Fig. 2, being formed in the rear end of the tongue 12 into which the coupling member 5' of the following trailer may extend; the action of each succeeding trailer will therefore be similar to that described above, each trailer being steered, by the angular movement of its tongue with respect to the center axis of the preceding trailer, to follow in the path of said preceding trailer. The entire train will thus track in the path of the rear wheels of the tractor vehicle.

It will be readily seen that each trailer constitutes a complete unit, and is easily separable from the remainder of the train. By operating the release lever 9, the locking pin 6 is withdrawn, thereby freeing the coupling member 5 from the socket member 4 of the preceding vehicle. The lateral arm 25 thereupon falls to a vertical position and is immediately locked by its bolt 26, in which position it supports the forward end of the trailer tongue 12. The trailer, separated from the train and having its forward end thus supported, can easily be moved about by hand, as desired.

The invention has been described and herewith illustrated in its preferred form, but it is to be understood that changes of form and construction, within the scope of the claims hereto appended, may be made without departing from the spirit of the invention. It is therefore my wish to be construed as claiming the invention as broadly as the prior art will permit.

Having thus described my invention, what is claimed and desired to be protected by Letters Patent is:

1. In a road train comprising a tractor vehicle and a plurality of trailer vehicles, a fixed tongue extending forwardly from each trailer vehicle, a coupling member flexibly connected to said tongue and adapted for separable connection with the preceding vehicle, a transversely disposed arm fixed to and extending horizontally from said coupling member, said arm being adapted to be moved into a vertical position to support the forward end of said tongue and said coupling member when detached from the preceding vehicle, and means for automatically steering each trailer vehicle to cause it to track in the path of the preceding vehicle.

2. In a road train comprising a tractor vehicle and a plurality of trailer vehicles, a fixed tongue extending forwardly from each trailer vehicle, a coupling member rotatably and pivotally connected with said tongue and adapted for separable connection with the preceding vehicle, a transversely disposed arm fixed to and extending horizontally from said coupling member, said arm being adapted to be moved into a vertical position to support the forward end of said tongue and said coupling member when detached from the preceding vehicle, locking means for retaining said arm in said vertical position, and means for automatically steering each trailer vehicle to cause it to track in the path of the preceding vehicle.

3. In a road train comprising a tractor vehicle and a plurality of trailer vehicles, each trailer vehicle having an axle, a steering spindle pivotally connected with each end of said axle, a supporting wheel mounted upon each steering spindle, a forwardly extending tongue fixed to said trailer vehicle, a coupling member rotatably and pivotally connected with said tongue and adapted for separable connection with the preceding vehicle, a transversely disposed arm fixed to and extending horizontally from said coupling member, said arm being adapted to be moved into a vertical position to support the forward end of said tongue and said coupling member when detached from the preceding vehicle, and a system of steering rods and levers connecting said transverse arm with said steering spindles to steer the trailer vehicle in the track of the preceding vehicle.

4. In a road train comprising a tractor vehicle and a plurality of trailer vehicles, a socket member carried by each vehicle, a coupling member adapted for separable connection with said socket member, locking means for retaining said coupling member within said socket member, a forwardly extending tongue fixed to each trailer vehicle, the forward end of said tongue having universal pivotal connection with said coupling member, a transversely disposed arm fixed to and extending horizontally from said coupling member, said arm being adapted to be moved into a vertical position to support the forward end of said tongue and said coupling member when detached from said socket member, and means for automatically steering each trailer vehicle to cause it to follow in the track of the preceding vehicle.

5. In a road train comprising a tractor vehicle and a plurality of trailer vehicles, each trailer vehicle having an axle and a pair of supporting wheels mounted thereon, said wheels being capable of swinging movement in a horizontal plane relative to the vehicle, a socket member carried by each vehicle, a coupling member adapted for separable connection with said socket member, means for retaining said coupling member within said socket member, a forwardly extending tongue fixed to each trailer vehicle and having universal pivotal connection with said coupling member, a transversely disposed arm fixed to and extending horizontally from said coupling member, said arm being adapted to be moved into a vertical position to support the forward end of said tongue and said coupling member when detached from said socket member, and a steering rod extending rearwardly from said transverse arm and connected with the wheels of said trailer vehicle to steer the same in the track of the preceding vehicle.

6. A trailer vehicle for flexible road trains comprising a body, an axle secured thereto, a pair of road-running wheels mounted upon said axle, a longitudinaly disposed tongue fixed to and extending from said body, a coupling member rotatably and pivotally connected to the free end of said tongue, said coupling member being adapted for separable connection to an adjacent vehicle of the train, and a transversely disposed arm extending from said coupling member, said arm being adapted to be moved into a vertical position to support the free end of said tongue and said coupling member.

7. A trailer vehicle for flexible road trains comprising a body, an axle secured thereto, a pair of road-running wheels mounted upon said axle, said wheels being adapted for swinging movement in a horizontal plane relative to said body, a longitudinally disposed tongue fixed to and extending from said body, a coupling member rotatably and pivotally connected to the free end of said tongue, said coupling member being adapted for separable connection to an adjacent vehicle of the train, a transversely disposed arm extending from said coupling member, said arm being adapted to be moved into a vertical position to support the free end of said tongue and said coupling member, and a steering rod pivotally connected to said transverse arm and adapted to swing said wheels in a horizontal plane to steer the trailer in the track of said adjacent vehicle.

In testimony whereof I have signed my name to this specification in the presence of two subscribing witnesses.

ROLLIE B. FAGEOL.

Witnesses:
CAROLINE E. SMITH,
HALLIE E. ESTES.